US012486925B2

(12) United States Patent
Bao et al.

(10) Patent No.: US 12,486,925 B2
(45) Date of Patent: Dec. 2, 2025

(54) FLOW CONTROL VALVE

(71) Applicant: Danfoss A/S, Nordborg (DK)

(72) Inventors: Jinfeng Bao, Nordborg (DK); Jiang Wu, Nordborg (DK); Anders Pedersen, Middelfart (DK)

(73) Assignee: DANFOSS A/S, Nordborg (DK)

( * ) Notice: Subject to any disclaimer, the term of this patent is extended or adjusted under 35 U.S.C. 154(b) by 61 days.

(21) Appl. No.: 18/561,011

(22) PCT Filed: May 9, 2022

(86) PCT No.: PCT/CN2022/091750
§ 371 (c)(1),
(2) Date: Nov. 15, 2023

(87) PCT Pub. No.: WO2022/242495
PCT Pub. Date: Nov. 24, 2022

(65) Prior Publication Data
US 2024/0255071 A1 Aug. 1, 2024

(30) Foreign Application Priority Data
May 17, 2021 (CN) .......................... 202110537412.9

(51) Int. Cl.
*F16K 39/02* (2006.01)
*F16K 1/38* (2006.01)
*F16K 1/42* (2006.01)

(52) U.S. Cl.
CPC .............. *F16K 39/022* (2013.01); *F16K 1/38* (2013.01); *F16K 1/42* (2013.01)

(58) Field of Classification Search
CPC .......... F16K 39/022; F16K 39/02; F16K 1/38; F16K 1/42; F16K 1/00; F16K 1/36;
(Continued)

(56) References Cited

U.S. PATENT DOCUMENTS

2009/0173905 A1* 7/2009 Boesch .................. F16K 25/00
251/359
2009/0188573 A1 7/2009 Dong et al.
(Continued)

FOREIGN PATENT DOCUMENTS

| CN | 101338835 A | 1/2009 |
| CN | 106090355 A | 11/2016 |
| CN | 107489776 A | 12/2017 |
| CN | 108071839 A | 5/2018 |
| CN | 108779871 A | 11/2018 |
| CN | 109578660 A | 4/2019 |
| CN | 110107695 A | 8/2019 |
| CN | 111765252 A | 10/2020 |

(Continued)

OTHER PUBLICATIONS

International Search Report mailed on Aug. 8, 2022, in connection with corresponding International Application No. PCT/CN2022/091750 (8 pp., including machine-generated English translation).

*Primary Examiner* — Patrick C Williams
(74) *Attorney, Agent, or Firm* — McCormick, Paulding & Huber PLLC

(57) ABSTRACT

A flow control valve includes a valve body (21), the valve body (21) having a valve seat part (211) provided therein, with a valve port (112) formed in the valve seat part (211); a spool (12), the spool (12) being axially movable to open or close the valve port (112), with a pressure-equalizing channel (121) provided in the spool (12), the pressure-equalizing channel connecting the valve port (112) and a back-pressure chamber (14), wherein the spool (12) has a substantially cylindrical lower end (222), and a conical hole (223) is formed in the spool (12), the conical hole (223) forming part of the pressure-equalizing channel (121), a bottom end of the conical hole (223) being located on a bottom plane (224) of the lower end (222), and the ratio of the diameter of the bottom end of the conical hole (223) to the diameter of the lower end (222) being greater than 0.88. In the present application, the conical hole (223) is provided on the spool (12) of the flow control valve, the conical hole (223) forming part of the pressure-equalizing channel (121), with the bottom end of the conical hole (223) being located (Continued)

on the bottom plane (224) of the lower end (222) of the spool (12). The conical hole (223) is dimensioned so that the pressure distributed at a lower part of the spool (12) becomes uniform, so as to balance fluid pressures in the back-pressure chamber (14) and the valve port (112).

17 Claims, 4 Drawing Sheets

(58) Field of Classification Search
CPC ........ F16K 1/52; F16K 27/02; F16K 27/0254; F16K 27/029; F16K 31/04; F16K 31/06; F25B 41/34
See application file for complete search history.

(56) References Cited

U.S. PATENT DOCUMENTS

| | | | |
|---|---|---|---|
| 2010/0116910 A1* | 5/2010 | Girlinger | F16K 1/42 239/96 |
| 2012/0248363 A1 | 10/2012 | Inagaki | |
| 2016/0109027 A1* | 4/2016 | Le Jossec | F16K 1/42 251/333 |
| 2017/0175929 A1* | 6/2017 | Fuhst | F16K 1/54 |

FOREIGN PATENT DOCUMENTS

| | | |
|---|---|---|
| CN | 217583188 U | 10/2022 |
| JP | 2007032863 A | 2/2007 |
| JP | 2014035006 A | 2/2014 |
| JP | 2017223247 A | 12/2017 |

\* cited by examiner

FLOW CONTROL VALVE

CROSS-REFERENCE TO RELATED APPLICATIONS

This application is a National Stage application of International Patent Application No. PCT/CN2022/091750, filed on May 9, 2022, which claims priority to Chinese Patent Application No. 202110537412.9, filed on May 17, 2021, each of which is hereby incorporated by reference in its entirety.

TECHNICAL FIELD

The present application relates to the field of fluid control, in particular to a flow control valve.

BACKGROUND

Flow control valves are widely used in the technical field of fluid control. Under the driving action of an actuator, a spool of a flow control valve can open or close a valve port, thereby achieving opening/closing of the flow control valve or flow regulation control.

In existing flow control valves of a pressure-balancing type, the pressure-bearing area of an upper part of the spool and the diameter of the valve port are generally configured to be equal, and a pressure-equalizing channel is provided in the spool. The pressure-equalizing channel is used to guide in pressure from a lower part of the spool (the valve port side) to the upper part of the spool, so that the upper part and lower part of the spool have the same pressure, in order to achieve spool balancing. However, due to the highly complex flow characteristics of fluids, full balancing of the spool is very difficult to achieve.

SUMMARY

To solve the abovementioned problem, the present application provides a flow control valve, comprising: a valve body having a valve seat part provided therein, with a valve port formed in the valve seat part; a spool which is axially movable to open or close the valve port, with a pressure-equalizing channel provided in the spool, the pressure-equalizing channel connecting the valve port and a back-pressure chamber, wherein the spool has a substantially cylindrical lower end, and a conical hole is formed in the spool, the conical hole forming part of the pressure-equalizing channel, a bottom end of the conical hole being located on a bottom plane of the lower end, and the ratio of the diameter of the bottom end of the conical hole to the diameter of the lower end being greater than 0.88.

Optionally, the cone angle of the conical hole is 40°-120°.

Optionally, the ratio of the diameter of the bottom end of the conical hole to the diameter of the lower end is 0.89-0.97.

Optionally, the ratio of the diameter of the bottom end of the conical hole to the diameter of the lower end is 0.92-0.96.

Optionally, a guide hole is provided in the valve body, a guide part guided by the guide hole is provided on the spool, a sealing member is provided on either the guide hole or the guide part, and the diameter of the guide part is equal to the diameter of the lower end.

Optionally, the lower end further comprises a transitional rounded corner located between an outer cylindrical face of the lower end and the bottom plane of the lower end, the transitional rounded corner contacting the valve seat part to close the valve port.

Optionally, one end of the transitional rounded corner is tangential to the outer cylindrical face of the lower end, and another end of the transitional rounded corner is tangential to the bottom plane of the lower end.

Optionally, the valve seat part comprises a cylindrical valve port, a first conical part, a second conical part and a third conical part which are connected in sequence and have gradually increasing diameters, wherein the first conical part forms a seating face of the spool, and the angle between the second conical part and the axis of the valve port is smaller than the angle between the third conical part and the axis of the valve port, so as to provide different circulation areas at different degrees of opening of the spool.

Optionally, there is metal-to-metal hard sealing between the spool and the valve seat part.

Optionally, a connecting part is further provided between the pressure-equalizing channel and the conical hole, the connecting part being cylindrical and/or conical.

In embodiments of the present application, the conical hole is provided in the spool of the flow control valve, the conical hole forming part of the pressure-equalizing channel, and the bottom end of the conical hole being located on the bottom plane of the lower end of the spool.

The ratio of the diameter of the bottom end of the conical hole to the diameter of the lower end of the spool is greater than 0.88, so that the pressure distributed at a lower part of the spool is made uniform, so as to balance the fluid pressures in the back-pressure chamber and the valve port.

BRIEF DESCRIPTION OF THE DRAWINGS

To facilitate understanding of the present application, it is described in more detail below on the basis of exemplary embodiments with reference to the drawings. In the drawings, identical or similar reference labels are used to indicate identical or similar members. It should be understood that the drawings are merely schematic, and the dimensions and proportions of members therein are not necessarily precise.

DETAILED DESCRIPTION

Figure 1:
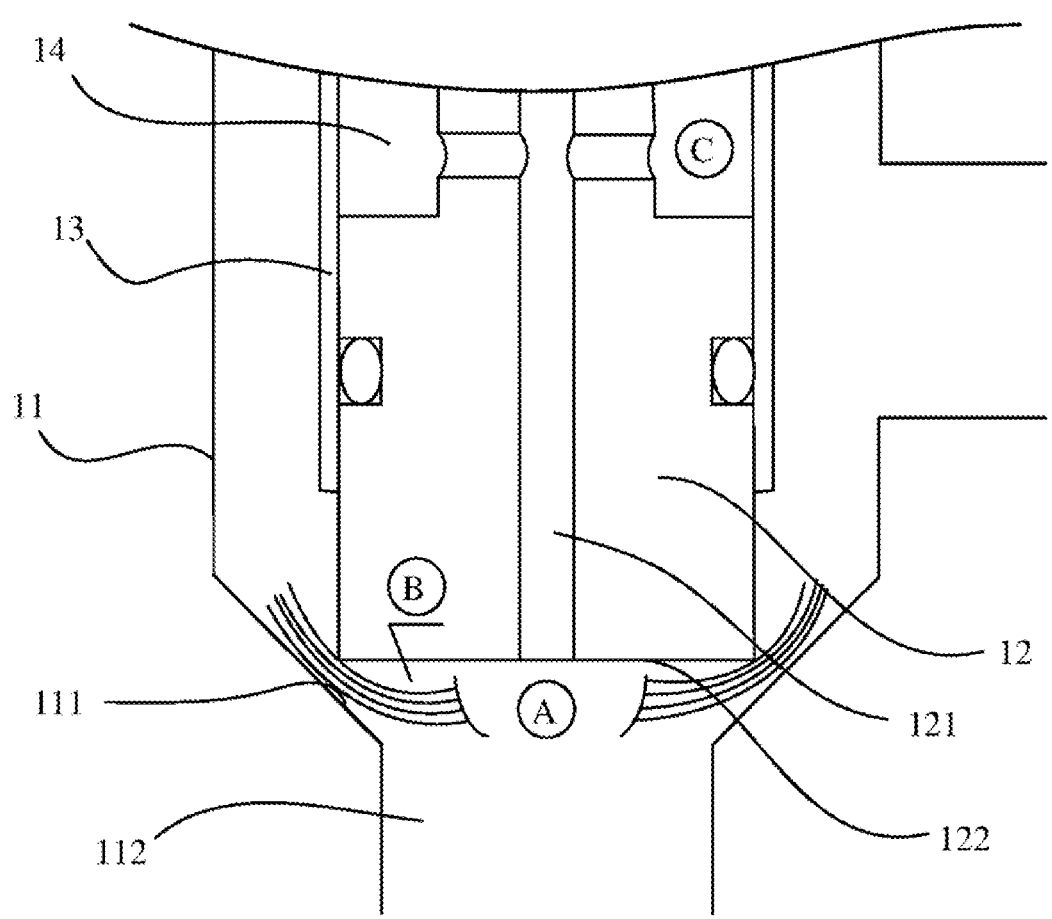
FIG. 1 is a schematic structural drawing illustrating the main parts of an existing flow control valve.

Embodiments of the flow control valve of the present application are explained below with reference to the drawings. The concepts of "upper" and "lower" herein correspond to "upper" and "lower" in the drawings.

As shown in FIG. 1, an existing flow control valve 1 comprises a valve body 11 and a spool 12. A valve seat part 111 is provided on the valve body 11, and a valve port 112 is formed on the valve seat part 111. The spool 12 is disposed in the valve body 11, and located in a guide part 13. The spool 12 can move axially along the guide part 13 so that the spool 12 abuts or moves away from the valve seat part 111, thereby opening or closing the valve port 112, and thus achieving the opening/closing of the flow control valve 1 or flow regulation control. A pressure-equalizing channel 121 is provided in the spool 12, to guide fluid from the valve port 112 into a back-pressure chamber 14.

However, the inventors of the present application have discovered that when fluid flows in from the valve port 112, due to the flow characteristics of the fluid, the pressure actually exerted by the fluid on a bottom plane 122 at a lower part of the spool 12 is not uniform. Fluid in a central region (region A in FIG. 1) at the lower part of the spool 12 has higher density and higher pressure than fluid in a region (region B in FIG. 1) other than the central region at the lower part of the spool. Pressure in the central region (region A in FIG. 1) at the lower part of the spool 12 will flow into the back-pressure chamber 14 (region C in FIG. 1) through the pressure-equalizing channel 121, so the pressure of the back-pressure chamber 14 is equal to the pressure in the central region at the lower part of the spool. However, due to the fact that the pressure at the lower part of the spool is not uniform, a downward pressure difference will arise between the pressures at the upper and lower parts of the spool 12, and consequently, full balancing of the spool 12 of the flow control valve 1 will be very difficult to achieve.

Figure 2:
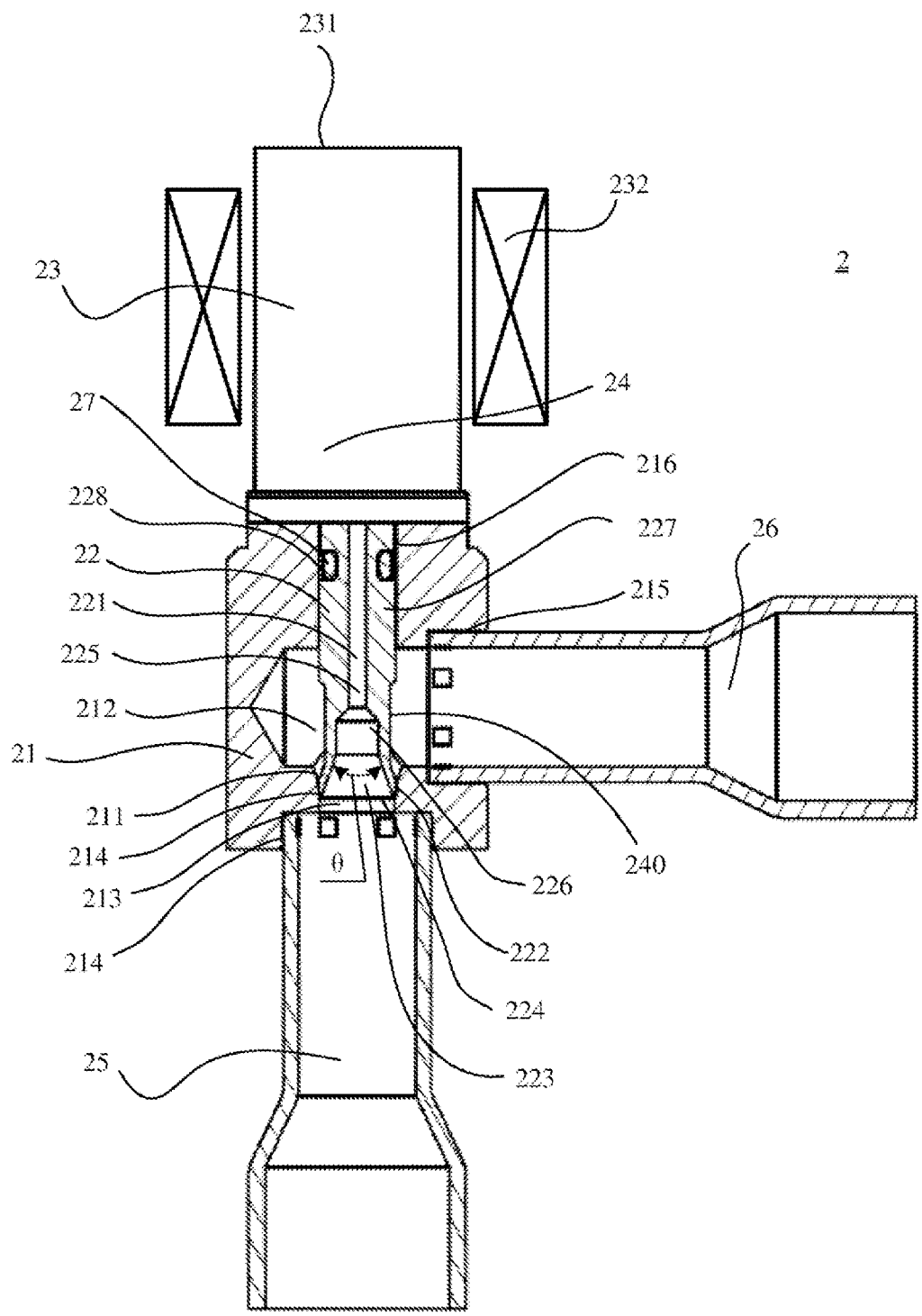
FIG. 2 is a longitudinal sectional view of a flow control valve provided in embodiments of the present application, in a closed-valve state.

To solve this problem, embodiments of the present application provide a flow control valve 2; the flow control valve 2 is a pressure-balancing flow control valve. As shown in FIG. 2, the flow control valve 2 may comprise a valve body 21, a spool 22 and an actuating part 23.

Figure 3:
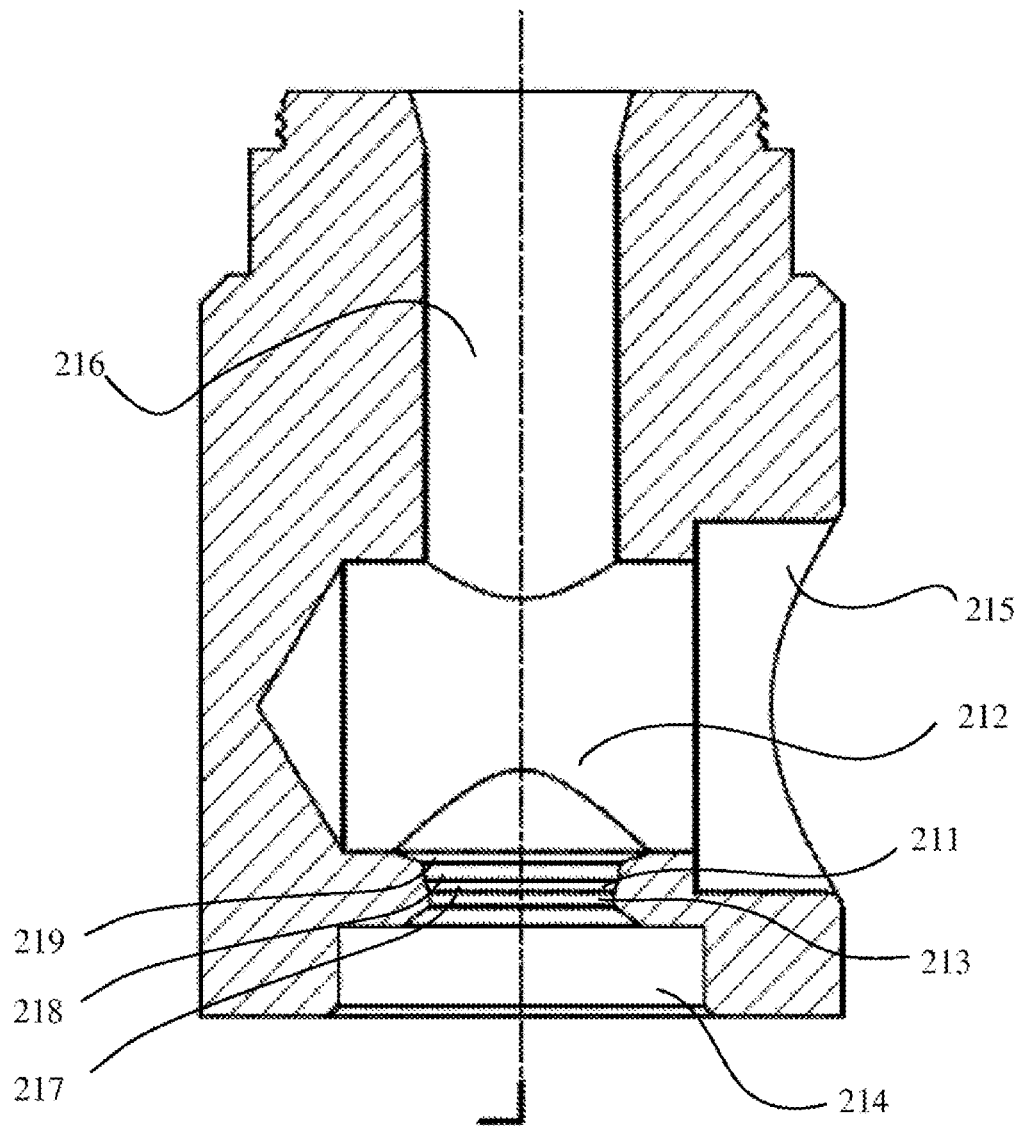
FIG. 3 is a longitudinal sectional view of the valve body in FIG. 2.

As FIG. 3 clearly shows, a valve seat part 211 and a valve chamber 212 are provided in the valve body 21. The valve seat part 211 may be located at a lower end of the valve body 21, and a valve port 213 is formed in the valve seat part. A first installation hole 214 is provided at a lower end of the valve port 213, and a second installation hole 215 may be provided at a side end of the valve chamber 212.

Continuing to refer to FIG. 2, the spool 22 can move axially to pass through the valve chamber 212 and abut or move away from the valve seat part 211, and thus can close or open the valve port 213. A pressure-equalizing channel 221 connecting the valve port 213 and a back-pressure chamber 24 is provided in the spool 22. The pressure-equalizing channel 221 may be located at the centre of the spool 22.

The actuating part 23 may comprise a rotor located in a housing 231 and a stator 232 outside the housing 231; the housing 231 and the valve body 21 form a closed chamber (not shown in the figures), and the actuating part 23 is used for driving the spool 22 to move axially. When the actuating part 23 drives the spool 22 to abut the valve seat part 211, the valve port 213 is in a closed-valve state so as to block the flow of fluid between the valve port 213 and the valve chamber 212; when the actuating part 23 drives the spool 22 to move away from the valve seat 212, the valve port 213 is in an open-valve state so as to allow the flow of fluid between the valve port 213 and the valve chamber 212, and the degree of opening of the spool 22 can control the flow rate of fluid.

In addition, in some embodiments, as shown in FIG. 2, a first connector tube 25 is provided in the first installation hole 214, and a second connector tube 26 is provided in the second installation hole 215. When the first connector tube 25 acts as an outlet tube and the second connector tube 26 acts as an inlet tube, the flow direction of fluid is a first flow direction. When the first connector tube 25 acts as an inlet tube and the second connector tube 26 acts as an outlet tube, the flow direction of fluid is a second flow direction.

Figure 4:
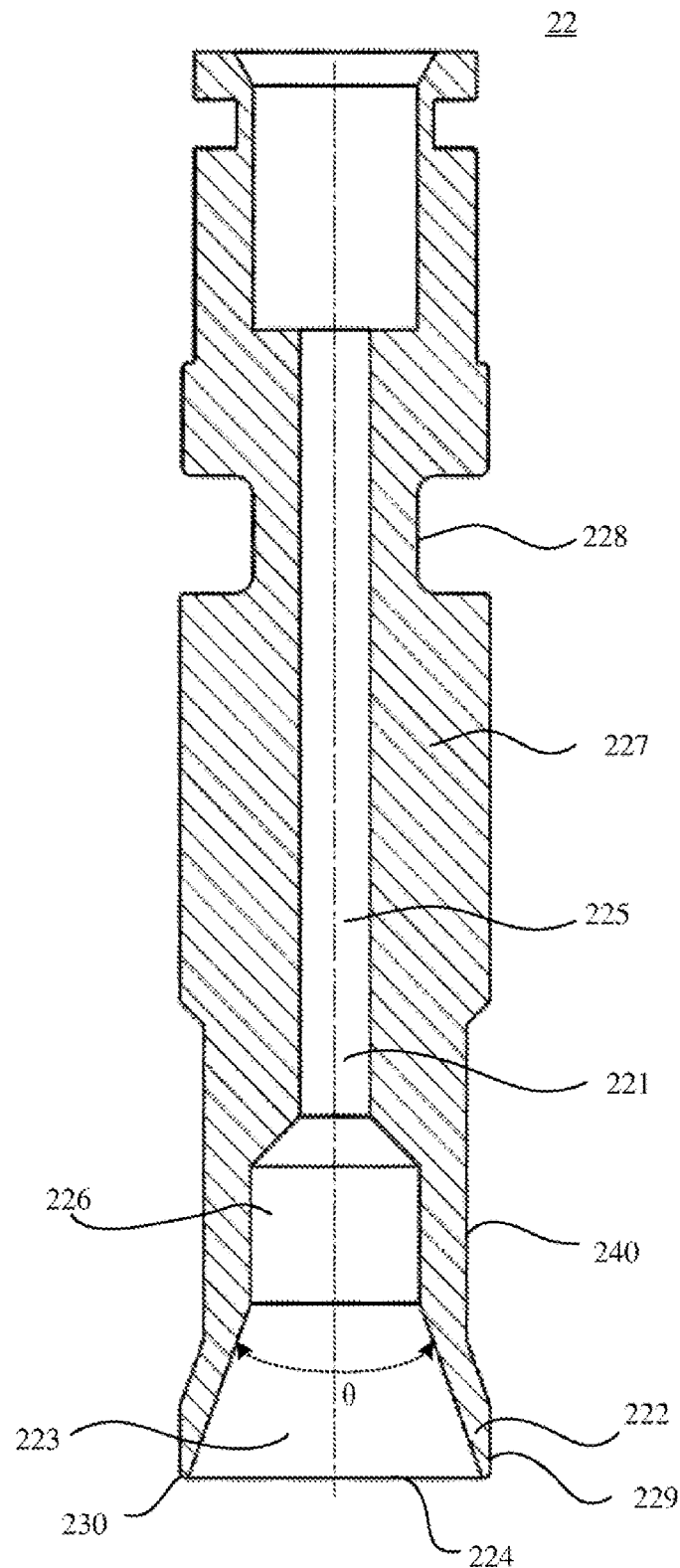
FIG. 4 is a longitudinal sectional view of the spool in FIG. 2.

It can be seen clearly with reference to FIG. 4 that the spool 22 has a substantially cylindrical lower end 222, and a conical hole 223 is formed in the spool 22. The conical hole 223 forms part of the pressure-equalizing channel 221, and a bottom end of the conical hole 223 is located on a bottom plane 224 of the lower end 222. The ratio of the diameter of the bottom end of the conical hole 223 to the diameter of the lower end 222 is greater than 0.88, wherein the diameter of the lower end 222 is the diameter of a substantially cylindrical outer profile of the lower end 222.

In embodiments of the present application, the conical hole 223 is provided in the spool 22 of the flow control valve, the conical hole 223 forming part of the pressure-equalizing channel 221, with the bottom end thereof being located on the bottom plane 224 of the lower end of the spool. The ratio of the diameter of the bottom end of the conical hole 223 to the diameter of the lower end 222 of the spool is greater than 0.88. This configuration enables the pressure distributed at the valve port 213 at the lower part of the spool 22 to be distributed as uniformly as possible, so as to balance the fluid pressures in the back-pressure chamber 24 and the valve port 213. The effect of fully balancing the upper and lower parts of the spool 22 by this equalization of pressure is most pronounced in the case of the second flow direction mentioned above.

In embodiments of the present application, no specific limitations are applied to the opening direction and specific dimensions of the conical hole 223. As shown in FIG. 4, an opening of the conical hole 223 faces toward the bottom plane 224, and a cone angle $\theta$ of the conical hole 223 is 40°-120°. The diameter of the bottom end of the conical hole 223 is greater than the diameter of a top end of the conical hole. The ratio of the diameter of the bottom end of the conical hole 223 to the diameter of the lower end 222 is 0.89-0.97; preferably, the ratio of the diameter of the bottom end of the conical hole 223 to the diameter of the lower end 222 is 0.92-0.96. In particular, in embodiments of the present application, the ratio of the diameter of the bottom end of the conical hole 223 to the diameter of the lower end 222 is 0.95. Defining the dimensions of the conical hole 223 in the manner described above enables the pressures of fluid in the back-pressure chamber 24 and the valve port 213 to be balanced as well as possible.

In the present application, no specific limitations are applied to parts of the pressure-equalizing channel 221 other than the conical hole 223. In some embodiments, the pressure-equalizing channel 221 may comprise the conical hole 223 and a cylindrical hole of uniform diameter, and the conical hole 223 may extend toward the bottom plane 224 from the cylindrical hole. In other embodiments, as shown in FIGS. 2 and 4, the pressure-equalizing channel 221 may comprise a cylindrical part 225, a connecting part 226 and a conical hole 223; the cylindrical part 225, connecting part 226 and conical hole 223 are connected in sequence and have gradually increasing diameters. The connecting part 226 may be cylindrical or conical, or may have a combined conical and cylindrical shape. Providing the connecting part 226 can not only reduce the weight of the spool 22 so as to lighten the load on the actuating part 23, but can also avoid the problem of high processing difficulty due to the cylindrical hole of the pressure-equalizing channel 221 being too long.

As shown in FIG. 2, in some embodiments, a guide hole 216 is provided in the valve body 21, and a guide part 227 guided by the guide hole 216 is provided on the spool 22. A sealing member 27 is provided on either the guide hole 216 or the guide part 227; the guide part 227 is slidably inserted in the guide hole 216 by means of the sealing member 27, and the sealing member 27 can isolate the back-pressure chamber 24 from the valve chamber 212. In the present application, no specific limitations are imposed on the diameter of the guide part 227; for example, the diameter of the guide part 227 may be equal to the diameter of the lower end 222 of the spool. By setting the diameter of the guide part 227 equal to the diameter of the lower end 222 of the spool, the difference between the areas of action of fluid in the back-pressure chamber 24 and the valve port 213 can be minimized, so as to further balance the top and bottom of the spool.

In embodiments of the present application, no specific limitations are imposed on the structure of the guide hole 216, as long as the guide hole 216 can guide the spool 22 to abut or move away from the valve seat part 211 in the direction of the guide hole 216. For example, as shown in FIG. 3, the guide hole 216 may be formed on the valve body 21 and formed integrally with the valve port 213. With such a configuration, the guide hole 216 may be formed directly on the valve body 21, so the processing method is simple and processing costs can be considerably reduced. Alternatively, the guide hole 216 may be provided on a separate guide member, which may be installed in the valve body 21.

In embodiments of the present application, no specific limitations are applied to the structure and installation position of the sealing member 27. In some embodiments, the sealing member 27 may be a sealing ring, e.g. an O-ring seal or Y-ring seal, or a sealing ring coated with Teflon. Furthermore, as shown in FIGS. 2 and 3, the sealing member 27 may be installed between the guide part 227 and the guide hole 216, and an installation groove 228 for the sealing member 27 may be provided on the guide part 227. In other embodiments, the installation groove 228 for the sealing member 27 may be provided in the guide hole 216.

It is clear from the description above that the spool 22 can move axially to pass through the valve chamber 212 so that the lower end 222 thereof abuts or moves away from the valve seat part 211. When the lower end 222 contacts the valve seat part 211, the lower end 222 can be sealed against the valve seat part 211, so as to close the valve port 213. In embodiments of the present application, no specific limitations are imposed on the structure of the lower end 222. In some embodiments, as shown in FIG. 4, the lower end 222 comprises an outer cylindrical face 229 located at the lower end and the bottom plane 224 of the lower end, and a transitional rounded corner 230 may be provided between the bottom plane 224 and the outer cylindrical face 229, wherein the lower end 222 contacts the valve seat part 211 by means of the transitional rounded corner 230, so as to close the valve port 213. The mating of the transitional rounded corner 230 with the valve seat part 211 enables the area of action of fluid at the valve port 213 to be as close as possible to the area of action of fluid at the sealing member 27, and the transitional rounded corner 230 accomplishes metal-to-metal hard sealing between the spool 22 and the valve seat part 211, so as to avoid using another sealing member, thus simplifying the sealing structure.

In the present application, no specific limitations are imposed on the structure of the transitional rounded corner 230. For example, as shown in FIG. 4, one end of the transitional rounded corner 230 is tangential to the outer cylindrical face 229 of the lower end, and another end of the transitional rounded corner 230 is tangential to the bottom plane 224 of the lower end. That is, the structure of the transitional rounded corner 230 may always be kept as ¼ of a full circle.

Furthermore, in some embodiments, as shown in FIG. 4, an annular groove 240 arranged around the axis of the spool 22 may be provided on a side wall of the spool 22, at a position between the guide part 227 and the lower end 222. The annular groove 240 can reduce the weight of the spool, and can thus reduce the load on the actuating part 23. It will be understood that it is also possible for no annular groove 240 to be provided, such that the guide part 227 extends all the way to the lower end 222.

In embodiments of the present application, no specific limitations are imposed on the structure of the valve seat part 211, as long as the mating of the valve seat part 211 with the spool 22 can achieve opening/closing of the valve port 213. For example, the valve seat part 211 may comprise a cylindrical portion and a conical portion; the cylindrical portion forms the valve port 213, while the conical portion is connected to the cylindrical portion and forms a seating face. The conical portion may be a conical portion having a single cone angle; such a valve seat 212 is structurally simple and relatively convenient to process. In other embodiments, as shown in FIG. 3, the valve seat 212 may be formed of a cylindrical valve port 213, and a conical portion formed by a first conical part 217, a second conical part 218 and a third conical part 219 which are connected in sequence starting at the cylindrical valve port 213 and have gradually increasing diameters, wherein the first conical part 217 forms a seating face of the spool 22. Configuring the conical portion as three conical parts each having different cone angles makes it possible to control the spool 22 to provide different flow rates at different degrees of opening. For example, the angle between the second conical part 218 and the axis of the valve port 213 may be smaller than the angle between the third conical part 219 and the axis of the valve port 213, so as to provide more precise flow control at small degrees of opening.

The above are merely preferred embodiments of the present application, which are not intended to limit it. Any modifications, equivalent substitutions, etc. made within the spirit and principles of the present application should be included in the scope of protection thereof.

What is claimed is:

1. A flow control valve, comprising:
a valve body having a valve seat part provided therein, with a valve port formed in the valve seat part;
a spool which is axially movable to open or close the valve port, with a pressure-equalizing channel provided in the spool, the pressure-equalizing channel connecting the valve port and a back-pressure chamber,
wherein the spool has a substantially cylindrical lower end, and a conical hole is formed in the spool, the conical hole forming part of the pressure-equalizing channel, a bottom end of the conical hole being located on a bottom plane of the lower end, and the ratio of the diameter of the bottom end of the conical hole to the diameter of the lower end being greater than 0.88.

2. The flow control valve as claimed in claim 1, wherein the cone angle of the conical hole is 40°-120°.

3. The flow control valve as claimed in claim 2, wherein there is metal-to-metal hard sealing between the spool and the valve seat part.

4. The flow control valve as claimed in claim 1, wherein the ratio of the diameter of the bottom end of the conical hole to the diameter of the lower end is 0.89-0.97.

5. The flow control valve as claimed in claim 4, wherein there is metal-to-metal hard sealing between the spool and the valve seat part.

6. The flow control valve as claimed in claim 1, wherein the ratio of the diameter of the bottom end of the conical hole to the diameter of the lower end is 0.92-0.96.

7. The flow control valve as claimed in claim 6, wherein there is metal-to-metal hard sealing between the spool and the valve seat part.

8. The flow control valve as claimed in claim 1, wherein a guide hole is provided in the valve body, a guide part guided by the guide hole is provided on the spool, a sealing member is provided on either the guide hole or the guide part, and the diameter of the guide part is equal to the diameter of the lower end.

9. The flow control valve as claimed in claim 8, wherein there is metal-to-metal hard sealing between the spool and the valve seat part.

10. The flow control valve as claimed in claim 1, wherein the lower end further comprises a transitional rounded corner located between an outer cylindrical face of the lower end and the bottom plane of the lower end, the transitional rounded corner contacting the valve seat part to close the valve port.

11. The flow control valve as claimed in claim 10, wherein there is metal-to-metal hard sealing between the spool and the valve seat part.

12. The flow control valve as claimed in claim 10, wherein one end of the transitional rounded corner is tangential to the outer cylindrical face of the lower end, and another end of the transitional rounded corner is tangential to the bottom plane of the lower end.

13. The flow control valve as claimed in claim 12, wherein there is metal-to-metal hard sealing between the spool and the valve seat part.

14. The flow control valve as claimed in claim 1, wherein the valve seat part comprises a cylindrical valve port, a first conical part, a second conical part and a third conical part which are connected in sequence and have gradually increasing diameters, wherein the first conical part forms a seating face of the spool, and the angle between the second conical part and the axis of the valve port is smaller than the angle between the third conical part and the axis of the valve port, so as to provide different circulation areas at different degrees of opening of the spool.

15. The flow control valve as claimed in claim 14, wherein there is metal-to-metal hard sealing between the spool and the valve seat part.

16. The flow control valve as claimed in claim 1, wherein there is metal-to-metal hard sealing between the spool and the valve seat part.

17. The flow control valve as claimed in claim 1, wherein a connecting part is further provided between the pressure-equalizing channel and the conical hole, the connecting part being cylindrical and/or conical.

* * * * *